US011454145B1

(12) United States Patent
Dietrich et al.

(10) Patent No.: US 11,454,145 B1
(45) Date of Patent: Sep. 27, 2022

(54) TRACTION DRIVE COOLING SYSTEM

(71) Applicant: Honeywell International Inc., Charlotte, NC (US)

(72) Inventors: Robert Alan Dietrich, Montebello, CA (US); Stephen L. White, Whittier, CA (US); Evgeni Ganev, Torrance, CA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/302,304

(22) Filed: Apr. 29, 2021

(51) Int. Cl.

| | |
|---|---|
| ***F01M 11/00*** | (2006.01) |
| ***F01M 5/00*** | (2006.01) |
| ***B60W 20/13*** | (2016.01) |
| ***B60W 10/30*** | (2006.01) |

(52) U.S. Cl.
CPC ........ *F01M 11/0004* (2013.01); *B60W 10/30* (2013.01); *B60W 20/13* (2016.01); *F01M 5/002* (2013.01); *F01M 2005/004* (2013.01); *F01M 2011/0025* (2013.01); *F01M 2011/0045* (2013.01)

(58) Field of Classification Search
CPC ............... F01M 11/0004; F01M 5/002; F01M 2005/04; F01M 2011/0025; B60W 10/30
See application file for complete search history.

(56) References Cited

U.S. PATENT DOCUMENTS

| | | | | |
|---|---|---|---|---|
| 4,418,777 | A * | 12/1983 | Stockton | F16H 57/0413 184/6.12 |
| 7,489,057 | B2 | 2/2009 | Zhou et al. | |
| 2005/0206166 | A1* | 9/2005 | Ganev | H02K 9/18 290/1 R |
| 2010/0295391 | A1 | 11/2010 | Perkins | |
| 2011/0169352 | A1 | 7/2011 | Nagao et al. | |
| 2013/0054058 | A1* | 2/2013 | Hawkins | B60L 7/22 903/903 |
| 2014/0042841 | A1 | 2/2014 | Rippel et al. | |
| 2018/0262089 | A1* | 9/2018 | Hatch | H02K 7/116 |
| 2020/0018527 | A1 | 1/2020 | Heisey et al. | |
| 2020/0395811 | A1 | 12/2020 | Ganev et al. | |

FOREIGN PATENT DOCUMENTS

| | | | |
|---|---|---|---|
| WO | 2020027436 | A1 | 2/2020 |

* cited by examiner

*Primary Examiner* — Syed O Hasan
(74) *Attorney, Agent, or Firm* — Shumaker & Sieffert, P.A.

(57) ABSTRACT

A housing for a drive system. The housing defines a motor cavity, an electronics cold plate, an oil cavity, and a coolant cavity. The coolant cavity defines a first coolant flow path configured to provide cooling to the motor cavity and the oil cavity. The coolant cavity defines a second flow path configured to provide cooling to the motor cavity and the cold plate. The housing defines a coolant inlet and a coolant outlet fluidically coupled to the first coolant flow path and the second coolant flow path, such that the first coolant flow path and the second coolant flow path are parallel fluid paths. In some applications the coolant paths can be connected in series. In some examples, the housing is configured to cause a counter-flow heat exchange between an oil flowing in the oil cavity and a coolant flowing in the first coolant flow path.

16 Claims, 8 Drawing Sheets

TRACTION DRIVE COOLING SYSTEM

TECHNICAL FIELD

The present disclosure relates to electric drive systems.

BACKGROUND

An electric drive system may be used for propulsion of an electric vehicle. A conventional electric drive system contains various drive components including a motor that provides electric drive power, a transmission that converts the electric drive power to a desired speed and torque, and a motor controller that controls the electric power supplied to the drive motor. The components may generate a substantial amount of heat during operation of the electric drive system. To remove this heat, the electric drive system may include a cooling system configured to remove the generated heat from one or more components of the electric drive system.

SUMMARY

The disclosure provides a housing for a drive system, such as a traction drive system. The housing defines a motor cavity, an electronics cold plate, an oil cavity, and a coolant cavity. The coolant cavity defines a first coolant flow path and a second coolant flow path. The first coolant flow path provides cooling to the motor cavity and the oil cavity. The second coolant flow path provides cooling to the motor cavity and the cold plate. The housing may define a coolant inlet and a coolant outlet fluidically coupled to the first coolant flow path and the second coolant flow path, such that the first coolant flow path and the second coolant flow path are parallel fluid paths. In examples, the housing is configured to cause a counter-flow heat exchange between oil flowing in the oil cavity and a coolant flowing in the first coolant flow path.

In an example, a housing for a motor comprises: a housing body defining a motor cavity configured to mechanically support a motor; an electronics cold plate configured to mechanically support electronics to control the motor; an oil cavity; and a coolant cavity thermally coupled to each of the motor cavity, the electronics cold plate, and the oil cavity, and configured to: define a first coolant path from a coolant inlet to a coolant outlet, wherein the first coolant path is thermally coupled to the oil cavity and the motor cavity, define a second coolant path from the coolant inlet to the coolant outlet, wherein the second coolant path is thermally coupled to the electronics cold plate and the motor cavity.

In an example, a housing for a motor comprises: a housing body defining a motor cavity configured to mechanically support a motor; an electronics cold plate configured to mechanically support electronics to control the motor; an oil cavity; and a coolant cavity thermally coupled to each of the motor cavity, the electronics cold plate, and the oil cavity, wherein: the housing body defines a coolant inlet fluidly coupled to the coolant cavity and a coolant outlet fluidly coupled to the coolant cavity, the coolant cavity is configured to define a first coolant path from the coolant inlet to the coolant outlet, wherein the first coolant path is thermally coupled to the oil cavity and the motor cavity, the coolant cavity is configured to define a second coolant path from the coolant inlet to the coolant outlet, wherein the second coolant path is thermally coupled to the electronics cold plate and the motor cavity, and the first coolant path and the second coolant path branch from the coolant inlet and reunite at the coolant outlet.

In an example, a method comprises: cooling a motor cavity and an oil cavity using a first coolant path defined by a coolant cavity of a housing for a motor and extending from a coolant inlet to a coolant outlet, wherein a housing body of the housing defines the coolant cavity, the motor cavity, and the oil cavity, and wherein the motor cavity is configured to mechanically support the motor; and cooling the motor cavity and an electronics cold plate using a second coolant path defined by the housing body and extending from the coolant inlet to the coolant outlet, wherein the housing body defines the electronics cold plate, and wherein the electronics cold plate is configured to mechanically support electronics to control the motor.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1:
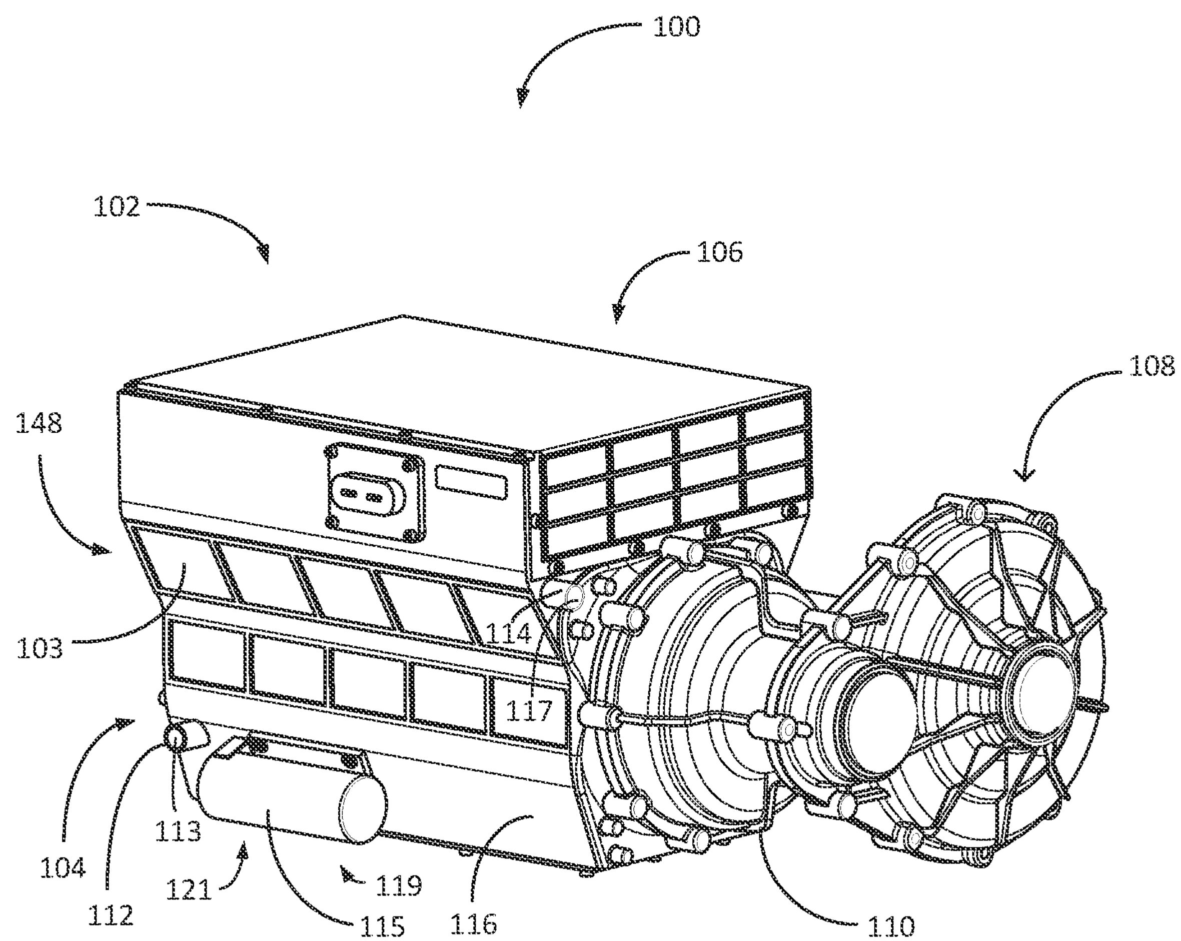
FIG. 1 is a perspective view diagram illustrating an example traction drive system.

This disclosure is directed toward a cooling system for integrated traction drive systems. As mentioned above, conventional traction drive systems may be configured as a combination of separate components that are each individually designed to provide a particular function. As a result, these conventional traction drive systems may include inefficiencies such as redundant components, suboptimal thermal management, and relatively large size and weight.

According to principles of the disclosure, integrated traction drive systems described herein may have lower weight, smaller size, and/or reduced cost compared to conventional traction drive systems. Example traction drive systems may include a housing configured to house a motor, motor controller, and transmission in a single housing. The housing body defines coolant paths configured to enable a coolant to provide cooling to at least the motor, the electronics, and an oil system configured to provide lubrication to the transmission and/or the motor. In examples, the housing includes a unified housing body configured to mechanically support at least the motor and one or more electronic components while defining the coolant paths. The unified housing body may increase the ability of the coolant flowing within the housing body to remove heat transferred to the housing body by a motor in the motor cavity, oil in the oil cavity, transmission in a transmission cavity and/or electronics thermally coupled to the electronics cold plate.

The housing body defines a motor cavity configured to mechanically support the motor and an electronics cold plate configured to provide cooling to an electronics space. The housing body further defines an oil cavity configured to serve as a sump for oil as the oil circulates within the housing to lubricate and/or cool the transmission and/or the motor. The housing body further defines a coolant cavity thermally coupled to at least the motor cavity, the electronics cold plate, and the oil cavity. The coolant cavity defines a plurality of coolant paths configured to channel a flow of coolant through the housing body to provide cooling to the motor, the electronics cold plate, and the oil cavity.

The plurality of coolant paths defined by the housing body includes a first coolant path and a second cooling path. The first coolant path may be a first coolant channel configured to thermally couple a first coolant flow with the oil cavity and the motor cavity. The second coolant path may be a second coolant channel configured to thermally couple a second coolant flow with the electronics cold plate and the motor cavity. Within each of the first and second coolant channels there may be arranged a number of parallel coolant paths directing the coolant in the same direction within each channel, confining the coolant flow, increasing its velocity, increasing heat transfer surface area and increasing heat transfer coefficient. The housing body includes a coolant inlet configured to receive a coolant into the housing body and a coolant outlet configured to discharge the coolant from the housing body. The housing body is configured to receive the coolant via the coolant inlet and split the coolant into the first coolant flow and the second coolant flow. The housing body is configured to merge the first coolant flow and the second coolant flow prior to discharging the coolant from the coolant outlet. Hence, the housing body is configured to define the first coolant flow and the second coolant flow as parallel fluid flows. In examples, the housing body is configured such that the first coolant path and the second coolant path branch from the coolant inlet and substantially re-unite at the cooling outlet. In some instances, the coolant flow path through the housing body may be configured to flow in a series, rather than a parallel, manner from one coolant channel to the next.

The housing body is further configured to define an oil flow path through the housing. For example, the housing body may be configured to supply a flow of oil to an interior of a gearbox housing surrounding one or more gears of the transmission and/or to a motor within the motor cavity. The housing body may be configured to cause the flow of oil to lubricate and/or cool the one or more gears and/or the motor before returning to the oil sump defined by the oil cavity. In examples, the housing includes an oil pump configured to drive the oil flow from the oil cavity and into the gearbox housing and/or motor cavity.

The housing body is configured to cool the oil flow within the oil cavity using the first coolant flow within the first coolant path. In examples, the housing body is configured to cause a counter-flow heat exchange between the oil flow within the oil cavity and the first coolant flow within the first coolant path. For example, the housing body may be configured such that the first coolant flow proceeds in a first direction from the cooling inlet to the cooling outlet. The housing body may be configured such that an oil pump drives the oil flow through the oil cavity in a second direction substantially opposite the first direction, such that the first coolant flow and the oil flow exchange heat in a counter-flow arrangement.

The housing body may define a first boundary wall thermally coupling the first coolant path and the oil cavity. The housing body may define a second boundary wall thermally coupling the first coolant path and the motor cavity. The housing body may define a third boundary wall thermally coupling the second coolant path and the electronics cold plate, and may define a fourth boundary wall thermally coupling the second coolant path and the motor cavity. In examples, the first boundary wall and the second boundary wall define a portion of a first coolant channel configured to provide the first coolant path, such that a coolant flowing in the first coolant path exchanges heat with both the first boundary wall (thermally coupled to the oil cavity) and the second boundary wall (thermally coupled to the motor cavity) substantially concurrently. The third boundary wall and the fourth boundary wall may define a portion of a second coolant channel configured to provide the second coolant path, such that a coolant flowing in the third coolant path exchanges heat with both the third boundary wall (thermally coupled to the electronics cold plate) and the fourth boundary wall (thermally coupled to the motor cavity) substantially concurrently.

In examples, the housing body includes a unitary member mechanically supporting the first boundary wall, the second boundary wall, the third boundary wall, and/or the fourth boundary wall. For example, the unitary member may include a contiguous solidified metal mechanically supporting the first boundary wall, the second boundary wall, the third boundary wall, and/or the fourth boundary wall. In some examples, the unitary member defines one or more of the first boundary wall, the second boundary wall, the third boundary wall, and/or the fourth boundary wall. The housing body may be configured such that the unitary member defines the first boundary wall and extends to define the second boundary wall as a single contiguous member. The housing body may be configured such that the unitary member defines the third boundary wall and extends to define the fourth boundary wall as a single contiguous member. In examples, the unitary member defines the first boundary wall, the second boundary wall, the third boundary wall, and the fourth boundary as a single contiguous member, such as a single contiguous member formed by casting and/or machining.

Hence, the housing body may define a unitary member configured to reduce and/or minimize thermal resistances between sections of the housing body and the first boundary wall, the second boundary wall, the third boundary wall, and/or the fourth boundary wall. The reduced thermal resistances may increase the ability of the coolant flowing within the housing body to remove heat transferred to the housing body by a motor in the motor cavity, oil in the oil cavity, and/or electronics thermally coupled to the electronics cold plate. The unitary member may be configured to cause a counter-flow heat exchange between oil flow within the oil cavity and the first coolant flow within the first coolant path.

FIG. 1 is a perspective view diagram illustrating an example traction drive system 100. Traction drive system 100 includes a housing 102 including housing body 103, a motor 104 within a motor cavity of housing 102, a motor controller 106 thermally coupled to an electronics cold plate (not shown) of housing 102, and a transmission 108 within a front end bell 110. Front end bell 110 may be attached to housing 102. Housing 102 further includes a coolant inlet 112 and a coolant outlet 114 fluidly coupled with a coolant cavity 116 within housing 102. Coolant cavity 116 defines a plurality of cooling channels within housing 102. In examples, traction drive system 100 includes an oil pump 115 configured to drive oil flow through housing 102. Housing 102 is configured to compactly integrate motor 104, motor controller 106, and transmission 108 in a single chassis.

In examples, motor 104 is configured to produce electrical drive power. In examples, motor 104 is a high-speed motor configured to operate at a shaft speed greater than about 10,000 revolutions per minute (RPM). Motor 104 may be configured to operate at a relatively high speed (e.g., greater than about 10,000 RPM) to produce a desired power at a relatively lower torque and correspondingly smaller diameter, volume, and/or weight. In some examples, motor 104 may be configured to operate at high shaft speeds. In some instances, motor 104 is configured to operate at a shaft speed greater than about 15,000 RPM, such as 30,000 RPM or 60,000 RPM. This may result in a substantially smaller volume and diameter for motor 104 without a substantial reduction in efficiency. For example, as a speed of motor 104 increases, a size of stators and/or rotors of motor 104 may decrease, such that a diameter of motor 104 across an axis of the shaft of motor 104 may be reduced. In some examples, motor 104 has a diameter less than 25 centimeters, such as less than 20 centimeters. In some examples, motor 104 has a volume less than 15 liters, such as less than 10 liters.

In addition to a reduced size and/or weight, high-speed motor 104 may operate at a higher torque to inertia ratio than a motor configured to operate at a lower shaft speed. For example, while a torque of motor 104 may be lower than a corresponding lower speed motor, motor 104 may have a lower shaft and rotor weight resulting in reduced inertia. As a result, a vehicle operating with traction drive system 100 may have a higher acceleration compared to a vehicle operating with a traction drive system with a motor output having a higher torque and lower speed. In some examples, motor 104 may be constructed from lightweight and/or highly thermally conductive materials, such as aluminum.

Motor controller 106 includes electronics configured to control motor 104 (e.g., operate at a high speed). Motor controller 106 may be communicatively coupled to and configured to control components of motor 104. For example, motor controller 106 may be configured to manage operation of components of motor 104 based on operational inputs for motor 104, such as speed control setpoints, and feedback from motor 104, such as speed measurements. Motor controller 106 may include any suitable arrangement of hardware, software, firmware, or any combination thereof, to perform the operations attributed to motor controller 106 that are described herein including any one or more microprocessors, digital signal processors (DSPs), application specific integrated circuits (ASICs), field programmable gate arrays (FPGAs), or any other equivalent integrated or discrete logic circuitry, as well as any combinations of such components. In some examples, motor controller 106 is configured to operate high-speed motor 104 at a maximum speed between about 12,000 and about 60,000 RPM. For example, as explained above, operation of motor 104 by motor controller 106 at a high speed may enable motor 104 a reduced weight, volume, and cost of motor 104.

Transmission 108 is mechanically coupled to motor 104 and configured to transmit power received from a motor shaft of motor 104 to an output shaft of transmission 108. Transmission 108 may be configured to cause the output shaft to have a reduced speed and increased torque suitable for driving axles of a vehicle to the motor shaft. For example, traction drive system 100 may be used in electric vehicles configured to drive axles at a speed that is substantially below the shaft speed of motor 104, such that an output speed may be reduced, and an output torque may be increased.

In examples, transmission 108 includes one or more gears configured to receive power from motor 104 and transmit some portion of the power to the output shaft of transmission 108. The one or more gears may define a gear ratio describing a relationship (e.g., a ratio) between a speed of the motor shaft and a speed of the output shaft. In some examples, transmission 108 has a gear ratio between about 12:1 and about 60:1, such as between about 20:1 and about 45:1. The gear ratio of transmission 108 may be dependent on a speed of motor 104, such that motor 104 having a speed of 30,000 RPM may be coupled to a corresponding transmission 108 having a gear ratio of between about 20:1 to about 30:1, while a motor 104 having a speed of 60,000 RPM may be coupled to a corresponding transmission 108 having a gear ratio of between about 30:1 to about 60:1. In examples, transmission 108 includes multiple stages of speed reduction and torque amplification. For example, traction drive system 100 may be configured for various characteristics, such as performance characteristics (tip speed, gear wear, power at certain shaft speeds, higher overall power across a range of shaft speeds) or specifications (lower overall size, weight, and/or cost). As such, a number and/or gear ratio of stages of speed reduction and torque amplification may be selected such that an overall size, weight, and/or cost of transmission 108 is reduced or a particular performance characteristic (e.g., a shape of a power curve) may be achieved.

Figure 2:
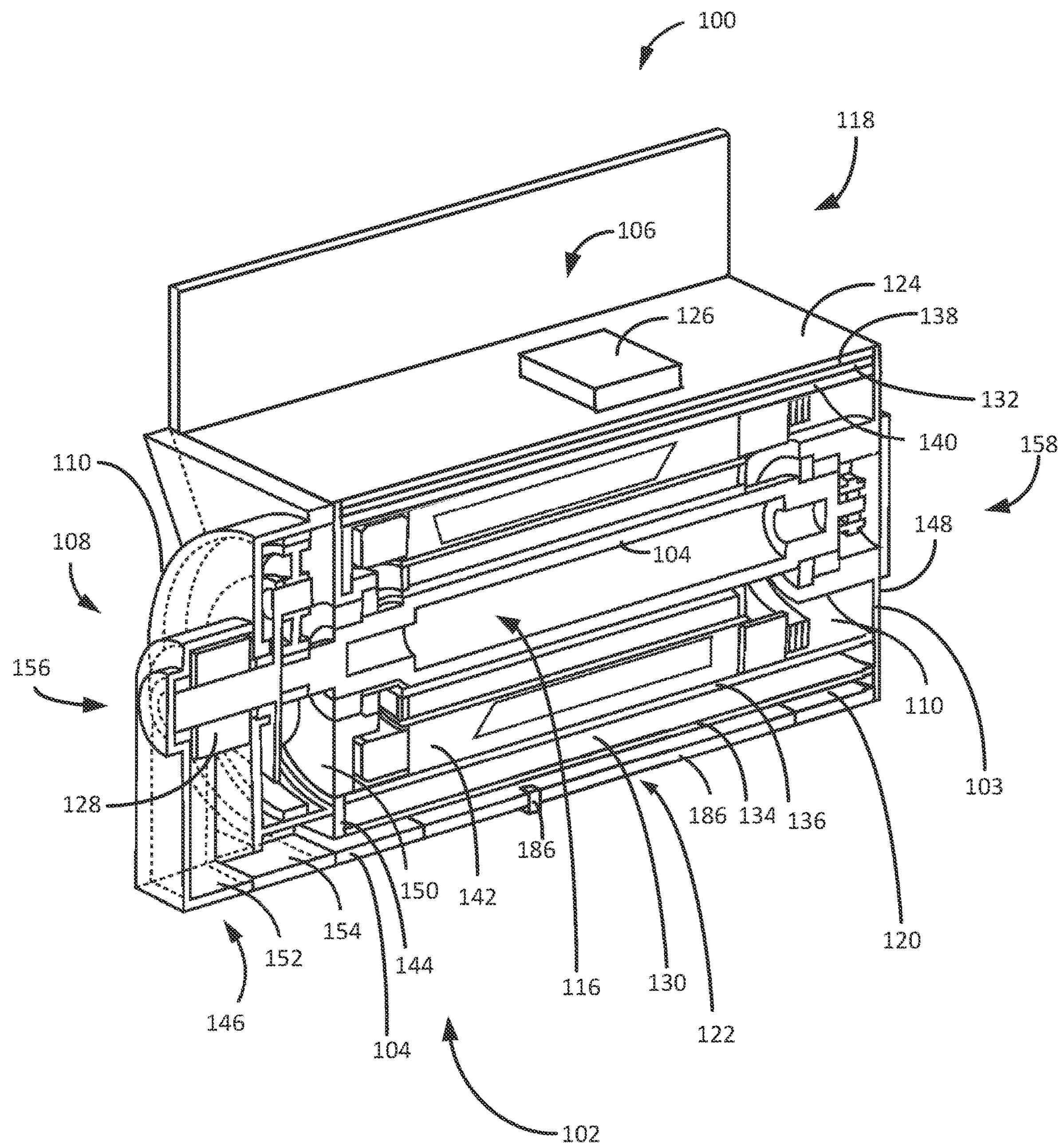
FIG. 2 is a perspective view, vertical cross-sectional diagram of the example traction drive system of FIG. 1.

FIG. 2 is a perspective view, vertical cross-sectional diagram illustrating an example of traction drive system 100 of FIG. 1. Housing body 103 of housing 102 defines a motor cavity 116, an electronics cavity 118, an oil cavity 120, and a coolant cavity 122. Motor cavity 116 is configured to support motor 104. Electronics cavity 118 includes a cold plate 124 thermally coupled to one or more electronic components 126 of motor controller 106. Oil cavity 120 is configured to define a flow path for an oil within housing 102 to, for example, provide lubrication and/or cooling to a gear 128 of transmission 108 and/or provide lubrication and/or cooling of the motor 104. Housing 102 may be configured to provide the oil flow using oil pump 115 (FIG. 1). Coolant cavity 122 is configured to define a plurality of coolant channels configured to distribute a coolant throughout housing 102, such as first coolant channel 130 and second coolant channel 132. Housing 102 is configured to receive the coolant through coolant inlet 112 (FIG. 1) and distribute the coolant to first coolant channel 130 and second coolant channel 132. Housing 102 is configured to cause first coolant channel 130 and second coolant channel 132 to merge before discharging the coolant through coolant outlet 114 (FIG. 1).

Coolant cavity 122 is thermally coupled to each of at least motor cavity 116, electronics cavity 118, and oil cavity 120. Coolant cavity 122 may be thermally coupled to each cavity by sharing a thermal interface with the respective cavity, such that heat may transfer from a component or fluid of the respective cavity through the thermal interface to cooling fluid in coolant cavity 122. Coolant cavity 122 is configured to receive coolant from a cooling system via coolant inlet 112 (FIG. 1), contain the coolant to receive heat from components of traction drive system 100, and return the coolant back to the cooling system via coolant outlet 114 (FIG. 1).

Housing body 103 defines a first coolant path through first coolant channel 130 and a second coolant path through second coolant channel 132. First coolant channel 130 is configured such that the first coolant path of first coolant channel 130 is thermally coupled to oil cavity 120 and motor cavity 116. In examples, housing body 103 defines a first boundary wall 134 thermally coupling the first coolant path within first coolant channel 130 and oil cavity 120. Housing 102 may define a second boundary wall 136 thermally coupling the first coolant path within first coolant channel 130 and motor cavity 116. In examples, first boundary wall 134 and second boundary wall 136 define a portion of first coolant channel 130, such that a coolant flowing in the first coolant path exchanges heat with both first boundary wall 134 (thermally coupled to oil cavity 120) and second boundary wall 136 (thermally coupled to motor cavity 116) substantially concurrently.

Second coolant channel 132 is configured such that the second coolant path of second coolant channel 132 is thermally coupled to cold plate 124 and motor cavity 116. In examples, housing body 103 defines a third boundary wall 138 thermally coupling the second coolant path within second coolant channel 132 and cold plate 124. Housing 102 may define a fourth boundary wall 140 thermally coupling the second coolant path within second coolant channel 132 and motor cavity 116. In examples, third boundary wall 138 and fourth boundary wall 140 define a portion of second coolant channel 132, such that a coolant flowing in the second coolant path exchanges heat with both third boundary wall 138 (thermally coupled to cold plate 124) and fourth boundary wall 140 (thermally coupled to motor cavity 116) substantially concurrently.

As used herein, when a first component and/or first channel of housing 102 is thermally coupled with a second component and/or second channel of housing 102, this may mean the first component and the second component may exchange heat through some portion of housing 102, such as boundary wall 134, 136, 138, 140. When a first fluid within a first component and/or first channel of housing 102 is thermally coupled with a second fluid within a second component and/or second channel of housing 102, this may mean the first fluid and the second fluid may exchange heat through some portion of housing 102, such as boundary wall 134, 136, 138, 140.

Oil cavity 120 is configured to contain an oil (e.g., a lubricating oil) for various components of traction drive system 100. Oil pump 115 (FIG. 1) may be fluidically coupled to oil cavity 120. Oil cavity 120 may be configured to define an oil flow path such that the oil may flow to various motor components of motor 104, such as bearings of motor 104, to lubricate and/or cool the various motor components and return to oil cavity 120. Similarly, oil cavity 120 may be configured to define an oil flow path such that oil may flow to transmission cavity 146 to supply oil to various transmission components of transmission 108, such as gears and bearings, to lubricate and/or cool the various transmission components and return to oil cavity 120.

In examples, traction drive system 100 includes dispersion components, such as sprayers, configured to distribute the oil to gears of transmission 108, bearings of motor 104, and other components within housing 102. Hence, the lubricating oil system may operate as an integrated oil system integrated into housing 102. In this way, motor 104 and transmission 108 may include a lubricating oil system capable of being cooled by the same cooling system. The lubricating oil system may include a variety of other components including, for example, an oil filter, oil pump 115 (FIG. 1), and/or other components.

Oil cavity 120 may be positioned at a bottom of traction drive system 100, such that oil may return to oil cavity 120 through gravity. Oil cavity 120 may be thermally coupled with first boundary wall 134. In examples, oil cavity 120 is configured to transfer heat from oil within oil cavity 120 to a coolant within first coolant channel 130 defined by coolant cavity 122. In this way, traction drive system 100 may cool lubricating oil for both motor 104 and transmission 108 without using an additional cooling system for each component, such as a separate heat exchanger (e.g., an oil cooler) for the lubricating oil system.

In examples, traction drive system 100 is configured to cause a counter-current heat exchange between oil within oil cavity 120 and a coolant in first coolant channel 130. The counter-current heat exchange between the oil and the coolant may allow for reduced weight and/or reduced cooling interfaces as compared to a parallel or cross flow heat exchange arrangement. In some examples, housing body 103 is configured to cause oil within oil cavity 120 to flow in a first direction and cause a coolant within first coolant channel 130 to flow in a second direction substantially opposite the first direction, such that the oil and the coolant exchange heat (e.g., through first boundary wall 134) in a counter-current flow arrangement.

For example, housing body 103 may be configured to cause an oil flow through oil cavity 120 substantially from a first end 156 of housing body 103 ("first housing end 156") toward a second end 158 of housing body 103 ("second housing end 158"). Housing body 103 may be configured to cause a coolant flow through first coolant channel 130 substantially from second housing end 158 toward first housing end 156. In other examples, housing body 103 may be configured to cause the coolant flow from first housing end 156 toward second housing end 158, and cause the oil flow from second housing end 158 toward first housing end 156. Housing body 103 may be configured to cause oil within oil cavity 120 to flow in any first direction and cause coolant within first coolant channel 130 to flow in a second direction substantially opposite the first direction.

In some examples, housing body 103 defines the second flow direction of the coolant through first coolant channel 130 when the coolant flows from coolant inlet 112 (FIG. 1), through first coolant channel 130, and to coolant outlet 114 (FIG. 1). Housing body 103 may be configured to receive oil from a discharge of an oil pump (e.g., oil pump 115 (FIG. 1)) to cause the oil to flow through oil cavity 120 in the first direction before discharging the oil to a suction of the oil pump. In some examples, oil pump 115 is fluidically coupled to oil cavity 120 and configured to cause the flow of oil through oil cavity 120 in the first direction.

Transmission cavity 146 is configured to house transmission 108 substantially within transmission cavity 146. In examples, transmission cavity 146 further includes a first stage cavity 150 configured to house a first stage gear assembly, a second stage cavity 152 configured to house a second stage gear assembly and a differential, and a transmission oil cavity 154. Transmission oil cavity 154 may be fluidically coupled to various cavities of transmission cavity 146 and oil cavity 120, such that lubricating oil within transmission cavity 146 may pass through transmission oil cavity 154 to oil cavity 120. In examples, transmission oil cavity 154 is positioned at a bottom of traction drive system 100, such that lubricating oil from transmission cavity 146, such as first stage cavity 150, second stage cavity 152, and transmission oil cavity 154 may return to oil cavity 120 due to gravity.

Motor cavity 116 is configured to house motor 104. For example, motor cavity 116 may be sized such that components of motor 104 are contained substantially within motor cavity 116. In examples, a motor stator 142 of motor 104 is thermally coupled to a wall (e.g., second boundary wall 136 and/or fourth boundary wall 140) of motor cavity 116, such that heat produced by motor stator 142 is transferred to the wall of motor cavity 116. In some examples, motor cavity 116 also shares a wall 144 with a transmission cavity 146 containing portions of transmission 108. Transmission cavity 146 may be defined at least in part by front end bell 110. Wall 144 may operate as a common structural interface between components of motor 104 in motor cavity 116 and components of transmission 108 in transmission cavity 146, such that an amount of material is reduced compared to traction drive systems in which a motor and a transmission are contained within separate housings. Housing 102 may further include a back end bell 148 configured to enclose motor 104 at a back end of traction drive system 100.

In examples, front end bell 110 is attached to housing body 103 and back end bell 148 is attached to housing body 103, and front end bell 110, housing body 103, and back end bell 148 define an outer boundary of housing 102. Housing 102 may be configured such that the first flow path defined by first coolant channel 130 and the second flow path defined by second coolant channel 132 are defined within (e.g., confined within) the outer boundary of housing 102. In examples, housing body 103 defines an outer body boundary, and the first flow path defined by first coolant channel 130 and the second flow path defined by second coolant channel 132 are defined within (e.g., confined within) the outer body boundary of housing body 103. Coolant inlet 112 may be configured to allow a coolant to flow into the outer boundary and/or outer body boundary. Coolant outlet 114 may be configured to allow a coolant to flow out of the outer boundary and/or outer body boundary. In examples, coolant inlet 112 defines an inlet opening 113 (FIG. 1) and coolant outlet 114 defines an outlet opening 117 (FIG. 1) fluidly coupled to the first flow path and the second flow path. Inlet opening 112 and outlet opening 117 may define a portion of the outer boundary and/or outer body boundary.

In examples, housing 102 defines an oil flow path from an oil inlet 119 (FIG. 1), through oil cavity 120 and transmission cavity 146, and to an oil outlet 121 (FIG. 1). Housing body 103 may define oil inlet 119 and/or oil outlet 121. The oil flow path may be defined within (e.g., confined within) the outer boundary of housing 102. In examples, oil inlet 119 defines an oil inlet opening (not shown) and oil outlet 121 defines an oil outlet opening (not shown), with the oil inlet opening and the oil outlet opening each fluidly coupled to the oil flow path. The oil inlet opening and the oil outlet opening may define a portion of the outer boundary and/or outer body boundary. In examples, housing body 103 defines oil inlet 119 and oil outlet 121. In some examples, traction drive system includes oil pump 115 (FIG. 1) fluidly coupled to the oil inlet opening and the oil outlet opening.

Electronics cavity 118 is configured to house motor controller 106. Electronics cavity 118 may be positioned at a top of housing 102. In examples, electronics cavity 118 is bounded by a cold plate 124. Cold plate 124 may be thermally coupled with third boundary wall 138. In examples, third boundary wall 138 defines cold plate 124. Cold plate 124 may be configured to dissipate heat generated by electronic component 126 and/or other components within electronics cavity 118. In examples, electronic component 126 directly contacts or is mounted on cold plate 124 through a thermal grease. Cold plate 124 is configured to transfer heat from electronics of motor controller 106 to a coolant within second coolant channel 132 defined by coolant cavity 122.

Coolant cavity 122 may define first coolant channel 130 and/or second coolant channel 132 in a variety of designs and sizes. In some examples, first coolant channel 130 and/or second coolant channel 132 are configured to provide different degrees of cooling to different components of traction drive system 100 based on an anticipated heat load from the respective component. In some examples, coolant cavity 122 is configured such that thermal interfaces of coolant cavity 122 shared with the various components may correspond to a heat load produced by the respective component. For example, a heat transfer surface area of a thermal interface between coolant cavity 122 and motor cavity 116 (e.g., second boundary wall 136) may be greater than a heat transfer surface area of a thermal interface between coolant cavity 122 and oil cavity 120 (e.g., first boundary wall 134). In examples, coolant cavity 122 may define various channels (e.g., first coolant channel 130 and/or second coolant channel 132) sized for particular flow rates, residence times, or other properties related to cooling provided by a respective coolant channel. In examples, a cooling system is fluidically coupled to coolant cavity 122 and configured to drive a coolant into coolant inlet 112 and out of coolant outlet 114. The cooling system may include a variety of components including, but not limited to, a coolant pump configured to drive coolant into coolant inlet 112, tubing for connecting the pump to coolant inlet 112, a controller and corresponding electrical connections for controlling the flow rate and pressure of the coolant, and the like.

Hence, housing body 103 may define motor cavity 116, electronics cold plate 124, oil cavity 120, and coolant cavity 122. Housing body 103 defines first coolant channel 130 thermally coupling a first coolant flow through coolant cavity 122 with oil cavity 120 (e.g., through first boundary wall 134) and motor cavity 116 (e.g., through second boundary wall 136). Housing body 103 defines second coolant channel 132 thermally coupling a second coolant flow through coolant cavity 122 with cold plate 124 (e.g., through third boundary wall 138) and motor cavity 116 (e.g., through fourth boundary wall 140). Housing body 103 is configured to supply coolant to first coolant channel 130 and second coolant channel 132 via coolant inlet 112 and discharge coolant from first coolant channel 130 and second coolant channel 132 via coolant outlet 114. In examples, housing body 103 is configured to cause a counter-flow heat exchange between an oil flow within oil cavity 120 and a coolant flow within first coolant channel 130.

Figure 3:
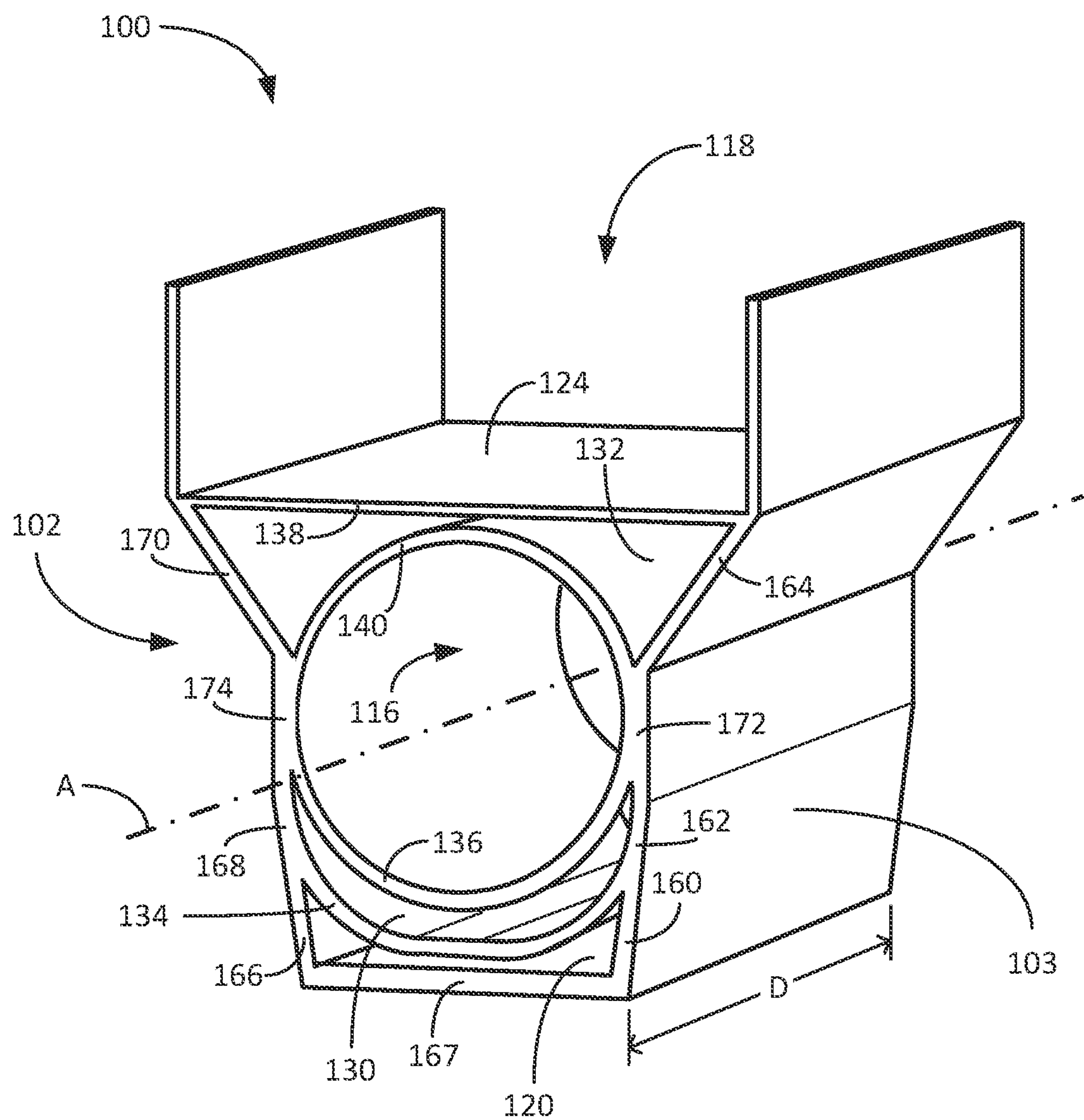
FIG. 3 is a perspective view, vertical cross-sectional diagram of an example housing for the traction drive system of FIGS. 1 and 2.

FIG. 3 illustrates a portion of housing body 103 defining first boundary wall 134, second boundary wall 136, third boundary wall 138, and fourth boundary wall 140. First boundary wall 134 is configured to thermally couple oil flowing in oil cavity 120 and coolant flowing in a first coolant path defined by first coolant channel 130. Second boundary wall 136 is configured to thermally couple motor 104 within motor cavity 116 and coolant flowing in a first coolant path defined by first coolant channel 130. Third boundary wall 138 is configured to thermally couple cold plate 124 and coolant flowing in a second coolant path defined by second coolant channel 132. Fourth boundary wall 140 is configured to thermally couple motor 104 within motor cavity 116 and coolant flowing in second cooling channel 132. Further, although depicted in FIG. 3 with only a single first coolant channel 130 and second coolant channel 132, housing body 103 may define any number of first coolant channels defining a first flow path as described herein, and may define any number of second coolant channels defining a second flow path as described herein.

Housing body 103 defines an axis A extending through motor cavity 116. Axis A may intersect first housing end 156 and second housing end 158 (FIG. 2). Housing body 103 may be configured such that motor cavity 116 substantially separates first coolant channel 130 and second coolant channel 132, such that first coolant channel 130 is thermally coupled to a first portion of motor cavity 116 (e.g., a "lower" portion) and second coolant channel 132 is thermally coupled to a second portion of motor cavity 116 (e.g., an "upper" portion). First coolant channel 130 may substantially separate oil cavity 120 and motor cavity 116. Second coolant channel 132 may substantially separate motor cavity 116 and cold plate 124. Cold plate 124 may substantially separate second coolant channel 132 and electronics cavity 118. In examples, housing body 103 defines one or more of motor cavity 116, first coolant channel 130, second coolant channel 132, and/or electronics cavity 118 over a distance D measured along the axis A.

Housing body 103 may be configured to reduce and/or eliminate material interfaces between components of housing 102, in order to, for example, decrease a thermal resistance to heat flow among the components. Decreasing the thermal resistance between two or more components may increase a heat transfer to a coolant within first coolant channel 130 and/or second coolant channel 132, decreasing the necessary dimensions of first coolant channel 130, second coolant channel 132, and/or housing 102 required to accommodate oil cavity 120, motor cavity 116, cold plate 124, and/or other portions of housing 102. As used herein, a "material interface" refers to a material discontinuity at a boundary between a material defining a first component of housing 102 and a material defining a second component of housing 102 (e.g., where the first component contacts the second component). The first component and the second component may be defined by materials having substantially similar or different compositions.

In examples, housing body 103 defines a unitary member configured to reduce and/or eliminate material interfaces within housing 102. In some examples, housing body is configured as a unitary member mechanically supporting first boundary wall 134, second boundary wall 136, third boundary wall 138, and/or fourth boundary wall 140. In examples, the unitary member of housing body 103 includes a contiguous solidified metal mechanically supporting first boundary wall 134, second boundary wall 136, third boundary wall 138, and/or fourth boundary wall 140. The unitary member may define one or more of first boundary wall 134, second boundary wall 136, third boundary wall 138, and/or fourth boundary wall 140. In examples, the unitary member of housing body 103 defines one or more of boundary walls 134, 136, 138, 140 and another portion of housing body 103 as a contiguous, unified material substantially lacking a material interface.

For example, housing body 103 may define first boundary wall 134 and a side wall 160 defining oil cavity 120 ("oil cavity side wall 160") as a contiguous, unified material. Housing body 103 may define first boundary wall 134 and/or second boundary wall 136 and a side wall 162 defining first coolant channel 130 ("first channel side wall 162") as a contiguous, unified material. Housing body 103 may define third boundary wall 138 and/or fourth boundary wall 140 and a side wall 164 defining second coolant channel 132 ("second channel side wall 164") as a contiguous, unified material. In examples, housing body 103 defines oil cavity side wall 166 opposite oil cavity side wall 160 and/or oil cavity bottom wall 167 between oil cavity side wall 160 and oil cavity side wall 166 as a contiguous, unified material with first boundary wall 134 and/or second boundary wall 136. Housing body 103 may define first channel side wall 168 opposite first channel side wall 162 as a contiguous, unified material with first boundary wall 134 and/or second boundary wall 136. Housing body 103 may define cold plate 124 and/or second channel side wall 170 opposite second channel side wall 164 as a contiguous, unified material with third boundary wall 138 and/or fourth boundary wall 140. In some examples, housing body 103 defines a side wall 172 defining motor cavity 116 ("motor cavity side wall 172") as a contiguous, unified material with second boundary wall 136 and/or fourth boundary wall 140. Housing body 103 may define a motor cavity side wall 174 opposite motor cavity side wall 172 as a contiguous, unified material with second boundary wall 136 and/or fourth boundary wall 140.

Housing body 103 may define two or more of oil cavity side wall 160, 166, first channel side wall 162, 168, second channel side wall 164, 170, and/or motor cavity side wall 172, 174 as a unitary member (e.g., a member comprising a contiguous, unified material). Housing body 103 may define the unitary member to extend over the distance D. In examples, housing body 103 may define any of oil cavity side wall 160, 166, first channel side wall 162, 168, second channel side wall 164, 170, and/or motor cavity side wall 172, 174 to extend over the distance D. In some examples, housing body 103 defines one or more of motor cavity 116, oil cavity 120, first coolant channel 130, second coolant channel 132, cold plate 124, and/or electronics cavity 118 to extend over the distance D.

In examples, first boundary wall 134, oil cavity bottom wall 167, oil cavity side wall 160, and oil cavity sidewall 166 define oil cavity 120. Housing body 103 may define first boundary wall 134, oil cavity bottom wall 167, oil cavity side wall 160, and oil cavity sidewall 166 as a contiguous, unified material extending over the distance D. In examples, first boundary wall 134, second boundary wall 136, first channel side wall 162, and first channel side wall 168 define first coolant channel 130. Housing body 103 may define first boundary wall 134, second boundary wall 136, first channel side wall 162, and first channel side wall 168 as a contiguous, unified material extending over the distance D. In examples, second boundary wall 136, motor cavity side wall 172, fourth boundary wall 140, and motor cavity side wall 174 define motor cavity 116. Housing body 103 may define second boundary wall 136, motor cavity side wall 172, fourth boundary wall 140, and motor cavity side wall 174 as a contiguous, unified material extending over the distance D. In examples, fourth boundary wall 140, second channel side wall 164, third boundary wall 138, and second channel side wall 170 define second coolant channel 132. Housing body 103 may define fourth boundary wall 140, second channel side wall 164, third boundary wall 138, and second channel side wall 170 as a contiguous, unified material extending over the distance D. In some examples, housing body 103 is configured to define at least oil cavity 120, first coolant channel 130, motor cavity 116, and second coolant channel 132 as a contiguous, unified material extending over the distance D. For example, housing body 103 may be a single contiguous member formed at least in part by casting and/or machining to define oil cavity 120, first coolant channel 130, motor cavity 116, and/or second coolant channel 132.

While not shown, in some examples, housing 102 may include one or more electrical interfaces embedded in housing 102. The electrical interfaces may be configured to electrically couple various drive components of traction drive system 100. For example, electrical interfaces may provide an electrical connection between stators of motor 104 and motor controller 106 through bus bars. By including embedded electrical interfaces, housing 102 may reduce or eliminate connectors and cables to reduce a cost, weight, volume, and/or reliability of traction drive system 100.

While not shown, in examples, first coolant channel 130 and/or second coolant channel 132 may be configured to define a plurality of coolant paths. In some examples, first coolant channel 130 and/or second coolant channel 132 are configured to define a plurality of substantially parallel coolant paths. First coolant channel 130 and/or second coolant channel 132 may define the plurality of cooling paths to, for example, direct a coolant substantially in the same direction within each of the coolant paths, confine the coolant flow to one or more coolant paths, increasing a velocity of the coolant flow in one or more coolant paths, increase a heat transfer surface area in one or more coolant paths, increase a heat transfer coefficient in one or more coolant paths, and/or for other reasons. In some examples, housing 102 defines one or more structures configured to define the plurality of cooling paths, such as ribs and/or fins extending from one or more of first boundary wall 134, first channel side wall 162, 168, second boundary wall 136, third boundary wall 138, second channel side wall 164, 170, fourth boundary wall 140, and/or other portions of housing 102.

Hence, traction drive system 100 may be configured to integrate the various drive components of traction drive system 100 into a single housing body 103 capable of cooling the various components using coolant cavity 122 to achieve a better thermal behavior of traction drive system 100 and/or a lower weight of traction drive system 100. For example, use of a single cooling fluid system and coolant cavity 122 may result in less weight than a traction drive system that includes more than one cooling system and a cooling circuit for the various drive components. As another example, use of a single cooling fluid system and coolant cavity 122 may reduce thermal spikes of the various drive components. As yet another example, use of an integrated housing may improve heat transfer between the various drive components, such that a more moderated thermal behavior may be achieved.

Figure 4:
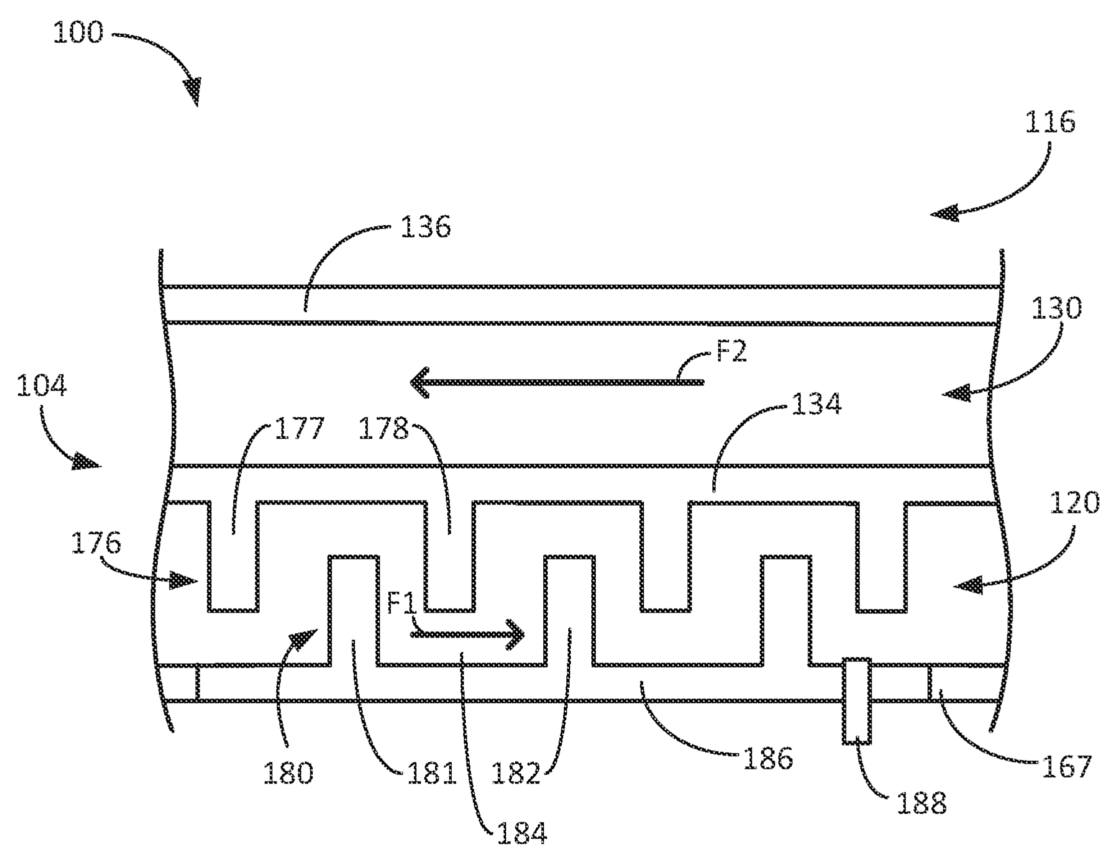
FIG. 4 is a vertical cross-sectional diagram of an example coolant channel and oil cavity for the traction drive system of FIGS. 1-3.

FIG. 4 illustrates a cross-sectional view of a portion of housing body 103 including a section of first coolant channel 130 and a section of oil cavity 120. FIG. 4 depicts first boundary wall 134 and second boundary wall 136 defining the section of first coolant channel 130, and first boundary wall 134 and oil cavity bottom wall 167 defining the section of oil cavity 120. Housing 102 is configured to cause an oil in oil cavity 120 to flow in a first flow direction F1 and a coolant in first coolant channel 130 to flow in a second flow direction F2 substantially opposite the first flow direction F1, such that the oil and coolant exchange heat via first boundary wall 134 in a counter-current heat exchange.

Housing body 103 may define one or more heat transfer structures 176 configured to enhance the transfer of heat between oil within oil cavity 120 and coolant within first coolant channel 130. In examples, heat transfer structures 176 are configured to extend into the oil flowing in the first flow direction F1 to substantially resist the flow, such that impingement of the oil flow on heat transfer structures 176 increases heat transfer between the oil flow and heat transfer structures 176. Heat transfer structures 176 may be configured to increase the turbulence of the oil flowing in the first flow direction F1 to increase heat transfer between the oil flow and heat transfer structures 176. Housing body 103 may define heat transfer structures 176 to exchange heat with first boundary wall 134, such that a coolant within first coolant channel 130 may exchange heat with the oil within oil cavity 120 via heat transfer structures 176 and boundary wall 134. Heat transfer structures 176 may include, for example, fin 177 and fin 178 configured to extend into the oil within oil cavity 120.

Fins 177, 178 may be configured as pin-fins, straight fins, or some other form factor configured to cause fins 177, 178 to extend into oil within oil cavity 120. Fins 177, 178 may be configured to increase heat transfer coefficients at the fluid-solid interface and also increasing surface area for heat transfer. In examples, housing body 103 defines heat transfer structures 176 as part of unitary member defining the section of first boundary wall 134, such that a contiguous, unified material defines heat transfer structures 176 and the section of first boundary wall 134. Defining heat transfer structures 176 and the section of first boundary wall 134 as a contiguous, unified material may reduce thermal resistance by reducing and/or eliminating material interfaces between heat transfer structures 176 and first boundary wall 134.

In examples, housing body 103 defines one or more heat transfer structures 180 configured to enhance the transfer of heat between oil within oil cavity 120 and oil cavity bottom wall 167 and/or oil cavity side walls 160, 166 (FIG. 3). Oil cavity bottom wall 167 and/or oil cavity side walls 160, 166 may be configured to exchange heat with another fluid, such as a fluid (e.g., air) comprising an atmosphere surrounding housing body 103. Heat transfer structures 180 may be configured to extend into the oil flowing in the first flow direction F1 to substantially resist the oil flow and/or increase turbulence of the oil flow to increase heat transfer between the oil flow and heat transfer structures 180. This increased turbulence due to heat transfer structures 176 may serve to enhance heat transfer between oil in oil cavity 120 and heat transfer structures 176, first boundary wall 134, oil cavity side walls 166, 168, and/or other portions of housing 102. Housing body 103 may define heat transfer structures 180 to exchange heat with oil cavity bottom wall 167 and/or oil cavity side walls 160, 166, such that the fluid surrounding housing body 103 may exchange heat with the oil within oil cavity 120 via heat transfer structures 180 and oil cavity bottom wall 167 and/or oil cavity side walls 160, 166. Heat transfer structures 180 may include, for example, fin 181 and fin 182 configured to extend into the oil within oil cavity 120.

Fins 181, 182 may be configured as pin-fins, straight fins, or some other form factor configured to cause fins 177, 178 to extend into oil within oil cavity 120. In examples, housing body 103 defines heat transfer structures 180 as part of unitary member defining a section of oil cavity bottom wall 167 and/or oil cavity side walls 160, 166, such that a contiguous, unified material defines heat transfer structures 180 and the section of oil cavity bottom wall 167 and/or oil cavity side walls 160, 166 in order to, for example, reduce a thermal resistance by reducing and/or eliminating material interfaces between heat transfer structures 180 and oil cavity bottom wall 167 and/or oil cavity side walls 160, 166.

In examples, housing body 103 is configured such that one or more of heat transfer structures 180 (e.g., fin 181) are interleaved with one or more of heat transfer structures 176

(e.g., fin 177, 178). In examples, a first heat transfer structure of heat transfer structures 176 (e.g., fin 181) and a second heat transfer structure of heat transfer structures 176 (e.g., fin 182) define a volume 184 within oil cavity 120. Housing body 103 may be configured such that a heat transfer structure of heat transfer structures 176 (e.g., fin 178) extends into the volume 184. In examples, housing body 103 is configured to cause some portion of an oil within oil cavity 120 to flow through the volume 184 when the oil flows through oil cavity 120 (e.g., when the oil is driven through oil cavity 120 by oil pump 115 (FIG. 1)).

Housing 102 and/or housing body 103 may include an oil pan 186 configured to detach from housing body 103 to allow access to oil cavity 120. In this instance provision by machining, casting, or other means, of simple or complex versions of heat transfer structures 176 and 180 is facilitated during the manufacturing process. Oil pan 186 may define a portion of oil cavity bottom wall 167 and/or oil cavity side walls 160, 166. Oil pan 186 may define some portion or substantially all of heat transfer structures 180. In examples, oil cavity bottom wall 167 and/or oil pan 186 includes an oil plug 188 configured to detach from oil cavity bottom wall 167, oil pan 186, and/or oil cavity side walls 160, 166 to provide an opening through oil cavity bottom wall 167, oil pan 186, and/or oil cavity side walls 160, 166. In examples, oil plug 188 is configured to provide an opening allow an oil within oil cavity 120 to drain from oil cavity 120 (e.g., gravity drain) through the opening.

Figure 5:
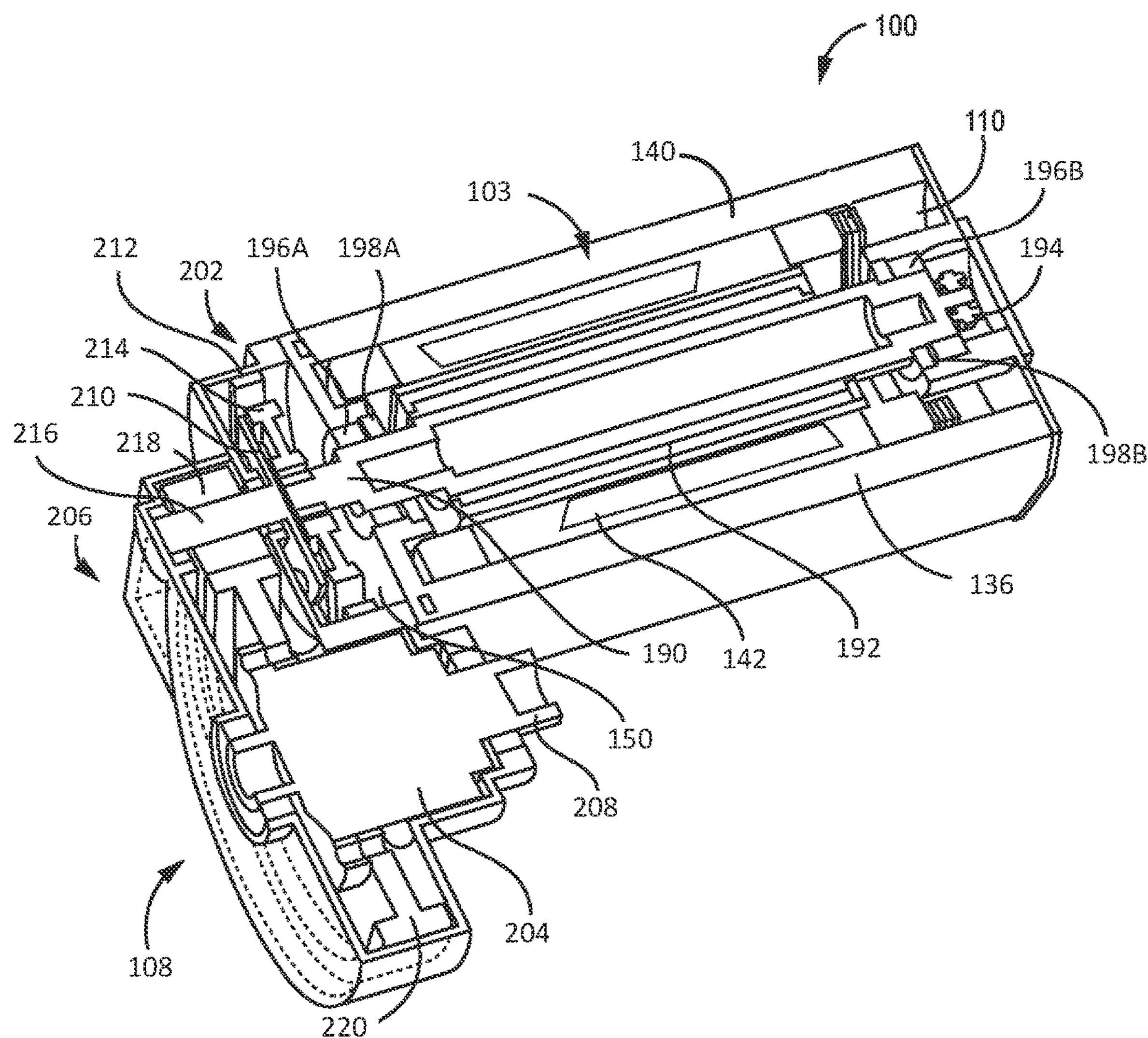
FIG. 5 is a perspective view, horizontal cross-sectional diagram illustrating an example motor for the traction drive system of FIGS. 1-4.

In addition to features of the housing directed toward reduced weight and/or improved thermal management, traction drive systems discussed herein may include a variety of other features directed toward improved performance and/or specifications. FIG. 5 is a perspective view, horizontal cross-sectional diagram illustrating portions of the traction drive system 100 that include various features directed toward reducing size, cost, and/or weight.

High-speed motor 104 includes motor stator 142, a motor shaft 190, and a motor rotor 192 coupled to motor shaft 190. In some examples, components of motor 104 may be configured to reduce a weight of motor 104. In the example of FIG. 5, motor shaft 190 includes a hollow cavity to reduce weight of motor shaft 190 and decrease inertia of motor shaft 190, such that motor 104 may have increased acceleration. Motor stator 142, motor shaft 190, and/or motor rotor 192 may be sized for a high speed for a particular electric drive power. In some examples, motor rotor 192 and motor shaft 190 may have a diameter less than about 10 centimeters, such as between about 5 centimeters and about 10 centimeters. In some examples, motor stator 142 may have a thickness less than about 2 centimeters.

Motor stator 142 may be coupled to one or more walls of motor cavity 116 (e.g., second boundary wall 136 and/or fourth boundary wall 140). In some examples, motor stator 142 is positioned in motor cavity 116 in an interference fit with intimate or close contact between motor stator 142 and the one or more walls of motor cavity 116. An interference fit may improve mechanical structure and increase heat transfer efficiency.

Motor 104 may include a variety of instrumentation. In some examples, motor 104 includes a resolver 194 coupled to motor shaft 190. Resolver 194 may be configured to measure a position of motor shaft 190, such as through magnets. Resolver 194 may be communicatively coupled to motor controller 106 and configured to transmit a position measurement to motor controller 106 such that motor controller 106 may determine a speed of motor shaft 190.

In some examples, high-speed motor 104 includes a front motor bearing 196A at a forward portion of motor shaft 190 and a rear motor bearing 196B at a rearward portion of motor shaft 190. Each of proximal and distal motor bearings 196A and 196B (referred to singularly as "motor bearing 196" and collectively as "motor bearings 196") may be lubricated by oil spray. For example, the lubricating oil system may lubricate one or more of motor bearings 196.

In some examples, high-speed motor 104 includes a front shaft seal 198A around motor shaft 190 between front motor bearing 196A and a proximal end of motor rotor 192 and a rear shaft seal 198B around motor shaft 190 between rear motor bearing 196B and a distal end of motor rotor 192. Each of proximal and distal shaft seals 198A and 198B (referred to singularly as "shaft seal 198" and collectively as "shaft seals 198") may prevent oil penetration into an air gap of motor 104 in motor cavity 116. For example, oil may be contained proximal to front shaft seal 198A and distal to rear shaft seal 198B. In some examples, high-speed motor 104 may not include seals, such that lubricating oil may contact portions of motor 104 between bearings 196.

In the example of FIG. 5, transmission 108 includes a first stage gear assembly 202 coupled to high-speed motor 104, a second stage gear assembly 206 coupled to first stage gear assembly 202, and a differential 204 coupled to second stage gear assembly 206. Transmission 108 is configured to receive electric drive power from motor shaft 190 and convert the electric drive power to an output shaft 208 having a reduced speed and amplified torque. In some examples, gears of transmission 108 may be manufactured from a high strength material, such as carbon steel.

First stage gear assembly 202 is mechanically coupled to high-speed motor 104 through motor shaft 190. First stage gear assembly 202 is configured for a first stage of speed reduction and torque amplification. In some examples, a gear ratio of first stage gear assembly 202 is between about 4:1 and about 10:1. In some examples, first stage gear assembly 202 is a planetary gear assembly. The planetary gear assembly includes a planetary sun gear 210 coupled to motor shaft 190, a planetary ring gear 212 coupled to housing 102, and a plurality of planet gears 214 coupled to a carrier shaft 216 and configured to interface with planetary sun gear 210 and planetary ring gear 212. Such configuration of first stage gear assembly 202 may reduce an audible noise and improve performance of motor 104.

Second stage gear assembly 206 is mechanically coupled to first stage gear assembly 202 through carrier shaft 216. Second stage gear assembly 206 is configured for a second stage of speed reduction and torque amplification. In some examples, a gear ratio of second stage gear assembly 206 is between about 3:1 and about 6:1. In some examples, second stage gear assembly 206 is a helical gear assembly. The helical gear assembly includes a primary gear 218 coupled to carrier shaft 216 and a differential ring gear 220 coupled to differential 204 and configured to interface with primary gear 218. In some examples, a gear ratio of first stage gear assembly 202 is higher than a gear ratio of second stage gear assembly 206.

Differential 204 is mechanically coupled to second stage gear assembly 206 through differential ring gear 220. Differential 204 is configured to transfer torque to one or more axles through output shaft 208. In examples in which traction drive system 100 is part of an electric vehicle, output shaft 208 may be coupled to axles of the electric vehicle, such that the speed and torque of output shaft 208 may represent a speed and power transferred by the axles to wheels of the electric vehicle.

Figure 6:
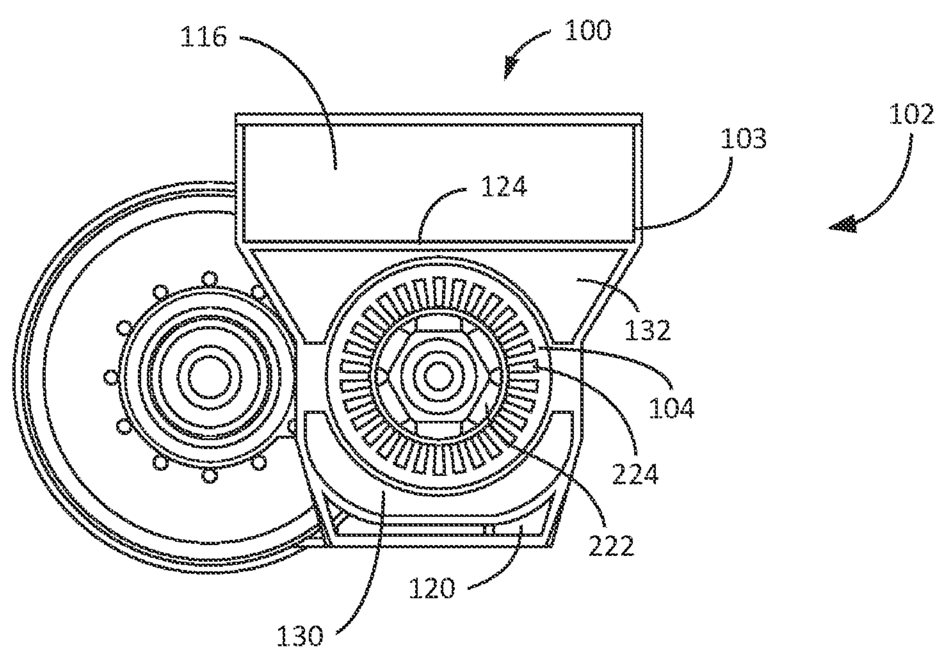
FIG. 6 is a perspective view, vertical cross-sectional diagram illustrating an example motor for the traction drive system of FIGS. 1-5.

As mentioned above, traction drive systems discussed herein may have motors configured to operate at high speeds. FIG. 6 is a side view, radial cross-sectional diagram illustrating the example traction drive system 100 of FIG. 1A that includes a motor configured to operate at about 30,000 RPM. In the example of FIG. 6, motor rotor 192 (FIG. 5) comprises a six-pole surface magnet arrangement that includes six motor magnets 222 and distributed motor slots 224; however, in other examples, motor rotor 192 may include a multi-pole surface magnet arrangement having any plurality of poles. While FIG. 6 illustrates a motor rotor having external magnets, in other examples, motor rotors may have internal magnets.

Figure 7:
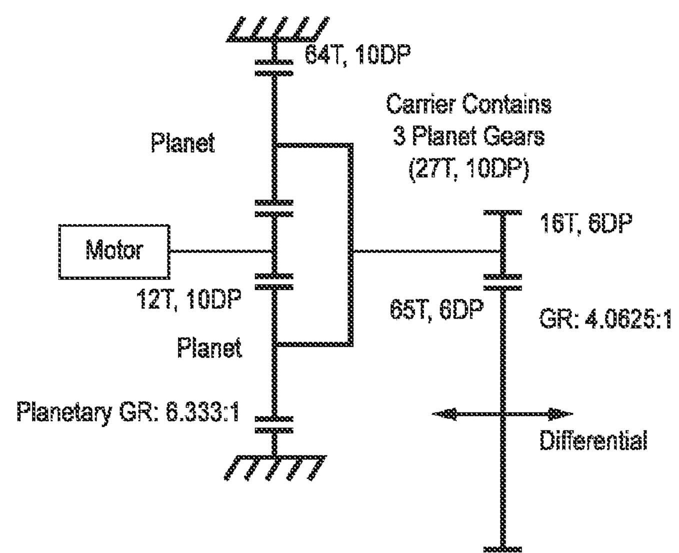
FIG. 7 is schematic illustrating example kinematics of a transmission of a traction drive system.

FIG. 7 is a conceptual diagram illustrating kinematics of one example of a transmission of traction drive systems discussed herein, such as transmission 108 of FIGS. 1-6. Transmission 108 (FIG. 1, FIG. 2, FIG. 5) receives electric drive power from a motor such as motor 104 operating at a motor speed, such as a motor speed greater than about 10,000 RPM. In examples, the motor operates at a speed of about 30,000 RPM. The transmission includes a first stage gear assembly, such as first stage gear assembly 202 having planetary sun gear 210, planetary ring gear 212, carrier shaft 216, and/or planet gears 214. The first stage gear assembly may define a gear ratio substantially establishing an output speed of the first stage gear assembly based on the input speed of the motor. In an example, the planetary ring gear has 64 teeth and 10 diametral pitch, while the planetary sun gear has 12 teeth and 10 diametral pitch. Carrier shaft, such as carrier shaft 216, may include a plurality of planet gears such as planet gears 214. Carrier shaft 216 may include, for example, three planet gears. In an example, the planet gears have 27 teeth and 10 diametral pitch. In an example, the first stage gear assembly defines a gear ratio of about 6.333:1 and generates a first stage output speed of 4,875 RPM when the input speed of the motor is 30,873 RPM.

The transmission of FIG. 7 includes a second stage gear assembly, such as second stage gear assembly 206 having primary gear 218 coupled to carrier shaft 216 and differential ring gear 220 coupled to differential 204. The second stage gear assembly defines a gear ratio substantially establishing an output speed of the second stage gear assembly based on the output speed of the input speed of the first stage gear assembly. In an example, the primary gear has 16 teeth and 6 diametral pitch, while the differential ring gear has 65 teeth and 6 diametral pitch. In an example, the second stage gear assembly defines a gear ratio of 4.0625:1 and a second stage output speed of about 1200 RPM when the first stage output speed is about 4,875 RPM. The transmission may define an overall gear ratio based on the first stage gear ratio and the second stage gear ratio (e.g., based on the product of the first stage gear ratio and the second stage gear ratio). In an example, the transmission defines an overall gear ratio of 25.728:1. In this way, a high-speed output of a motor, such as motor 104 (FIG. 2, FIG. 5), may have a speed reduced and torque amplified.

Traction drive systems discussed herein that utilize high-speed motors may have a reduced weight, volume, and/or cost. Table 1 illustrates various properties for three different speeds—12,000 RPM (12 KRPM), 30 KRPM, and 60 KRPM—of a motor, such as motor 104 of FIGS. 1-7.

TABLE 1

| Component | Property | 12 KRPM | 30 KRPM | 60 KRPM |
|---|---|---|---|---|
| Motor | Weight (kg) | 42 | 29.3 | 23 |
| | Volume (L) | 11.0 | 7.2 | 5.1 |
| | Diameter (mm) | 203 | 168 | 139 |
| | Efficiency (%) | 94.6 | 96.0 | 95.8 |
| Controller | Weight (kg) | 9.3 | 9.3 | 9.3 |
| | Volume (L) | 10.2 | 10.2 | 10.2 |
| Housing, Gearbox, Shaft, and Bearings | Weight (kg) | 43.7 | 43.7 | 41.7 |
| Total | Weight (kg) | 95 | 82.3 | 74 |
| Difference | Weight (kg) | 0 | −12.7 | −21 |

As shown in Table 1, a weight of the motor decreases as a speed of the motor increases. For example, a traction drive system having a 30 KRPM motor has a weight reduction of 13.4% from the 12 KRPM motor, while a traction drive system having the 60 KRPM motor has a weight reduction of 22.1% from the 12 KRPM motor.

As such, traction drive systems discussed herein may have a total system weight that substantially decreases with an increasing speed of the motor; motor weight and volume that substantially decreases with increasing speed of the motor; motor diameter that substantially decreases with increasing speed of the motor; cost of materials that substantially decreases with increasing speed due to reduced amount of material; motor efficiency that remains substantially the same at different speeds of the motor; motor controller weight that is substantially independent of speed of the motor; and various drive component weights of housing, transmission, and other engine parts that are substantially independent of speed of the motor.

Figure 8:
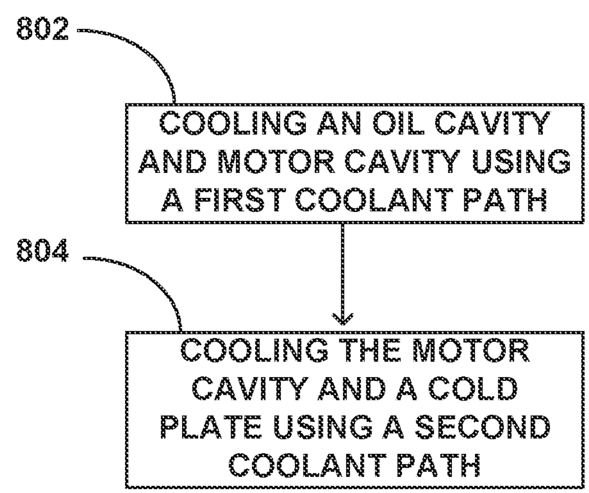
FIG. 8 is a conceptual flow diagram illustrating an example technique for cooling a traction drive system.

FIG. 8 illustrates a flow diagram of an example technique for cooling one or more components in a housing. Although the technique is described with reference to housing 102 of traction drive system 100 (FIGS. 1-7), in other examples, the technique may be used with other systems.

The technique includes cooling an oil cavity 120 and a motor cavity 116 defined by housing 102 (e.g., housing body 103) using a first coolant path (802). The first coolant path may be defined by first coolant channel 130. The technique may include providing a flow of a coolant to the first flow path defined by first coolant channel 130. In examples, the technique includes providing the coolant to the first coolant path of first coolant channel 130 through coolant inlet 112 defined by housing 102. The technique may include discharging coolant from the first coolant path defined by first coolant channel 130 from coolant outlet 114. In examples, the coolant within first coolant channel 130 exchanges heat with an oil within oil cavity 120. In examples, the coolant within first coolant channel 130 exchanges heat with the oil within oil cavity 120 via first boundary wall 134.

In examples, the coolant flows through first coolant channel 130 in a first direction and oil flows through oil cavity 120 in a second direction substantially opposite the first direction. In examples, a flow path from coolant inlet 112 to coolant outlet 114 defines the first direction. In some examples, oil pump 115 discharges the oil from a pump discharge and receives the oil in a pump suction to cause the oil to flow in the second direction. The coolant may flow through first coolant channel in a direction substantially from second housing end 158 toward first housing end 156.

The technique may include cooling and/or lubricating one or more gears in transmission 108, bearings 196, and/or some portion of motor 104 using the oil. The technique may include causing the oil to flow from oil cavity 120 to one or more gears in transmission 108, bearings 196, and/or some portion of motor 104 from oil cavity 120 and causing the oil to return to oil cavity 120 (e.g., via gravity). In examples, the flow of oil is caused to encounter and/or impinge heat transfer structures 176 and/or heat transfer structures 180 defined by housing 102 and extending into oil cavity 120.

The technique includes exchanging heat between the coolant within first coolant channel 130 and motor cavity 116. In examples, the coolant within first coolant channel 130 exchanges heat with motor cavity 116 via second boundary wall 136. In examples, a motor 104 within motor cavity 116 generates heat and transfers the heat to second boundary wall 136. In some examples, motor stator 142 substantially contacts second boundary wall 136 and transfers heat to the coolant within first coolant channel 130 via second boundary wall 136.

The technique includes cooling a cold plate 124 within electronics cavity 118 and motor cavity 116 using a second coolant path (804). The second coolant path may be defined by second coolant channel 132. The technique may include providing a flow of a coolant to the second flow path defined by second coolant channel 132. In examples, the technique includes providing the coolant to the second coolant path of second coolant channel 132 through coolant inlet 112 defined by housing 102 (e.g., housing body 103). The technique may include discharging coolant from the second coolant path defined by second coolant channel 132 from coolant outlet 114. In examples, cold plate 124 exchanges heat with electronic component 126 within electronics cavity 118. In examples, the coolant within second coolant channel 132 exchanges heat with cold plate 124 via third boundary wall 138.

The technique includes exchanging heat between the coolant within second coolant channel 132 and motor cavity 116. In examples, the coolant within second coolant channel 132 exchanges heat with motor cavity 116 via fourth boundary wall 140. In examples, motor 104 within motor cavity 116 generates heat and transfers the heat to fourth boundary wall 140. In some examples, motor stator 142 substantially contacts fourth boundary wall 140 and transfers heat to the coolant within second coolant channel 132 via fourth boundary wall 140.

In examples, the technique includes removing heat from oil cavity 120, motor cavity 116, and/or electronics cavity 118 using a unitary member of housing body 103 defining some portion of two or more of oil cavity 120, motor cavity 116, and/or electronics cavity 118. In examples, the unitary member defines two or more of first boundary wall 134, second boundary wall 136, third boundary wall 138, fourth boundary wall 140, oil cavity side wall 160, 166, oil cavity bottom wall 167, first channel side wall 162, 168, second channel side wall 164, 170, and/or motor cavity side wall 172, 174. The unitary member may be defined by a contiguous, solidified material, such as a metal and/or metal composition. In some examples, the unitary member defines two or more of first boundary wall 134, second boundary wall 136, third boundary wall 138, fourth boundary wall 140, oil cavity side wall 160, 166, oil cavity bottom wall 167, first channel side wall 162, 168, second channel side wall 164, 170, and/or motor cavity side wall 172, 174 over a distance D along axis A extending through motor cavity 116.

The present disclosure includes the following examples.

Example 1: A housing for a motor, the housing comprising: a housing body defining a motor cavity configured to mechanically support a motor; an electronics cold plate configured to mechanically support electronics to control the motor; an oil cavity; and a coolant cavity thermally coupled to each of the motor cavity, the electronics cold plate, and the oil cavity, and configured to: define a first coolant path from a coolant inlet to a coolant outlet, wherein the first coolant path is thermally coupled to the oil cavity and the motor cavity, define a second coolant path from the coolant inlet to the coolant outlet, wherein the second coolant path is thermally coupled to the electronics cold plate and the motor cavity.

Example 2: The housing of example 1, wherein the housing body defines the coolant inlet and the coolant outlet.

Example 3: The housing of example 1 or 2, wherein the coolant cavity defines a first fluid channel defining the first coolant path and defines a second fluid channel defining the second coolant path, and wherein the first fluid channel is substantially parallel to the second fluid channel.

Example 4: The housing of any of examples 1-3, wherein the first coolant path and the second coolant path branch from the coolant inlet, and wherein the first coolant path and the second coolant branch merge at the coolant outlet.

Example 5: The housing of any of examples 1-4, wherein the oil cavity is configured to define an oil flow path from a first end of the housing body toward a second end of the housing body, and wherein the fluid coolant cavity is configured to define the first coolant path from the second end of the housing body toward the first end of the housing body, such that an oil flowing in the oil flow path and a coolant flowing in the first coolant path exchange heat through a counter-flow heat exchange.

Example 6: The housing of example 5, further comprising an oil pump configured to drive the oil in the oil flow path from the first end of the housing body toward the second end of the housing body, wherein the coolant cavity defines the first coolant path such that a cooling fluid flows from the second end of the housing body toward the first end of the housing body when the cooling fluid flows from the coolant inlet to the coolant outlet.

Example 7: The housing of any of examples 1-6, further comprising a front end bell configured to define a gearbox interior to house one or more gears mechanically engaged with the motor, wherein the housing is configured to define an oil flow path from the oil cavity to the gearbox interior and returning to the oil cavity.

Example 8: The housing of any of examples 1-7, wherein the housing is configured to define an oil flow path from the oil cavity to the motor cavity and returning to the oil cavity.

Example 9: The housing of any of examples 1-8, wherein the housing body is a unitary member defining the motor cavity, the electronics cold plate, the oil cavity, and the coolant cavity.

Example 10: The housing of example 9, further comprising; a front end bell attached to the housing body; and a back end bell attached to the housing body, wherein the housing body, the front end bell, and the rear end bell define an outer boundary of the housing, wherein the first flow path is confined within the outer boundary of the housing, and wherein the second flow path is confined within the outer boundary of the housing.

Example 11: The housing of example 9 or example 10, further comprising: a front end bell attached to the housing body; a back end bell attached to the housing body; and an oil pump fluidly coupled to the oil cavity, wherein the housing defines an oil flow path from a discharge of the oil pump and returning to a suction of the oil pump, wherein the housing body, the front end bell, and the rear end bell define an outer boundary of the housing, and wherein the oil flow path is confined within the outer boundary of the housing.

Example 12: The housing of any of examples 1-11, further comprising the motor, wherein a stator of the motor is mechanically supported by a boundary of the motor cavity, wherein the coolant cavity defines the first coolant path to cause a coolant within the first coolant path to exchange heat with the stator through a first portion of the boundary of the motor cavity, and wherein the coolant cavity defines the second coolant path to cause a coolant within the second coolant path to exchange heat with the stator through a second portion of the boundary of the motor cavity.

Example 13: The housing of any of examples 1-12, wherein the housing body defines a wall between the first coolant path and the oil cavity, and wherein the wall defines a plurality of heat transfer structures extending from the wall and into the oil cavity.

Example 14: The housing of any of examples 1-13, further comprising an oil pan configured to attach to the housing body and define a boundary of the oil cavity, wherein the oil pan is configured to detach from the housing body to provide an access to the oil cavity.

Example 15: The housing of example 14, wherein the oil pan comprises a plurality of heat transfer structures configured to extend into the oil cavity when the oil pan is attached to the housing body.

Example 16: A housing for a motor, the housing comprising: a housing body defining a motor cavity configured to mechanically support a motor; an electronics cold plate configured to mechanically support electronics to control the motor; an oil cavity; and a coolant cavity thermally coupled to each of the motor cavity, the electronics cold plate, and the oil cavity, wherein: the housing body defines a coolant inlet fluidly coupled to the coolant cavity and a coolant outlet fluidly coupled to the coolant cavity, the coolant cavity is configured to define a first coolant path from the coolant inlet to the coolant outlet, wherein the first coolant path is thermally coupled to the oil cavity and the motor cavity, the coolant cavity is configured to define a second coolant path from the coolant inlet to the coolant outlet, wherein the second coolant path is thermally coupled to the electronics cold plate and the motor cavity, and the first coolant path and the second coolant path branch from the coolant inlet and reunite at the coolant outlet.

Example 17: The housing of example 16, wherein the oil cavity is configured to define an oil flow path from a first end of the housing body toward a second end of the housing body, and wherein the fluid coolant cavity is configured to define the first coolant path from the second end of the housing body toward the first end of the housing body, such that oil in the oil flow path and coolant in the first coolant path exchange heat through a counter-flow heat exchange.

Example 18: The housing of example 18 or example 19, further comprising: a front end bell attached to the housing body; a back end bell attached to the housing body; and an oil pump fluidly coupled to the oil cavity, wherein the housing body, the front end bell, and the rear end bell define an outer boundary of the housing, wherein the first flow path and the second flow path are confined within the outer boundary of the housing, and wherein the housing defines an oil flow path from a discharge of the oil pump and returning to a suction of the oil pump, wherein the oil flow path is confined within the outer boundary of the housing.

Example 19: A method comprising: cooling a motor cavity and an oil cavity using a first coolant path defined by a coolant cavity of a housing for a motor and extending from a coolant inlet to a coolant outlet, wherein a housing body of the housing defines the coolant cavity, the motor cavity, and the oil cavity, and wherein the motor cavity is configured to mechanically support the motor; and cooling the motor cavity and an electronics cold plate using a second coolant path defined by the housing body and extending from the coolant inlet to the coolant outlet, wherein the housing body defines the electronics cold plate, and wherein the electronics cold plate is configured to mechanically support electronics to control the motor.

Example 20: The housing of example 19, further comprising: flowing oil in the oil cavity from a first end of the housing body toward a second end of the housing body; flowing a coolant in the first coolant path from the second end of the housing body toward the first end of the housing body; and exchanging heat between the oil and the coolant.

Various examples have been described. These and other examples are within the scope of the following claims.

What is claimed is:

1. A housing for a motor, the housing comprising: a housing body defining a motor cavity configured to mechanically support a motor; an electronics cold plate configured to mechanically support electronics to control the motor; an oil cavity, wherein the oil cavity is configured to define an oil flow path from a first end of the housing body toward a second end of the housing body; and a coolant cavity thermally coupled to each of the motor cavity, the electronics cold plate, and the oil cavity, and configured to: define a first coolant path from a coolant inlet to a coolant outlet, wherein the coolant cavity defines the first coolant path from the second end of the housing body toward the first end of the housing body, and wherein the first coolant path is thermally coupled to the oil cavity and the motor cavity, such that oil flowing in the oil flow path and coolant flowing in the first coolant path exchange heat through a counter-flow heat exchange, define a second coolant path from the coolant inlet to the coolant outlet, wherein the second coolant path is thermally coupled to the electronics cold plate and the motor cavity, wherein the housing body is a unitary member defining the motor cavity, the electronics cold plate, the oil cavity, and the coolant cavity.

2. The housing of claim 1, wherein the housing body defines the coolant inlet and the coolant outlet.

3. The housing of claim 1, wherein the coolant cavity defines a first fluid channel defining the first coolant path and defines a second fluid channel defining the second coolant path, and wherein the first fluid channel is substantially parallel to the second fluid channel.

4. The housing of claim 1, wherein the first coolant path and the second coolant path branch from the coolant inlet, and wherein the first coolant path and the second coolant branch merge at the coolant outlet.

5. The housing of claim 1, further comprising an oil pump configured to drive the oil in the oil flow path from the first end of the housing body toward the second end of the housing body.

6. The housing of claim 1, further comprising a front end bell configured to define a gearbox interior to house one or more gears mechanically engaged with the motor, wherein the housing is configured to define an oil flow path from the oil cavity to the gearbox interior and returning to the oil cavity.

7. The housing of claim 1, wherein the housing is configured to define an oil flow path from the oil cavity to the motor cavity and returning to the oil cavity.

8. The housing of claim 1, further comprising; a front end bell attached to the housing body; and a back end bell attached to the housing body, wherein the housing body, the front end bell, and the rear end bell define an outer boundary of the housing, wherein the first flow path is confined within the outer boundary of the housing, and wherein the second flow path is confined within the outer boundary of the housing.

9. The housing of claim 1, further comprising: a front end bell attached to the housing body; a back end bell attached to the housing body; and an oil pump fluidly coupled to the oil cavity, wherein the housing defines an oil flow path from a discharge of the oil pump and returning to a suction of the oil pump, wherein the housing body, the front end bell, and the rear end bell define an outer boundary of the housing, and wherein the oil flow path is confined within the outer boundary of the housing.

10. The housing of claim 1, further comprising the motor, wherein a stator of the motor is mechanically supported by a boundary of the motor cavity, wherein the coolant cavity defines the first coolant path to cause a coolant within the first coolant path to exchange heat with the stator through a first portion of the boundary of the motor cavity, and wherein the coolant cavity defines the second coolant path to cause a coolant within the second coolant path to exchange heat with the stator through a second portion of the boundary of the motor cavity.

11. The housing of claim 1, wherein the housing body defines a wall between the first coolant path and the oil cavity, and wherein the wall defines a plurality of heat transfer structures extending from the wall and into the oil cavity.

12. The housing of claim 1, further comprising an oil pan configured to attach to the housing body and define a boundary of the oil cavity, wherein the oil pan is configured to detach from the housing body to provide an access to the oil cavity.

13. The housing of claim 12, wherein the oil pan comprises a plurality of heat transfer structures configured to extend into the oil cavity when the oil pan is attached to the housing body.

14. A housing for a motor, the housing comprising: a housing body defining a motor cavity configured to mechanically support a motor; an electronics cold plate configured to mechanically support electronics to control the motor; an oil cavity, wherein the oil cavity is configured to define an oil flow path from a first end of the housing body toward a second end of the housing body; and a coolant cavity thermally coupled to each of the motor cavity, the electronics cold plate, and the oil cavity, wherein: the housing body defines a coolant inlet fluidly coupled to the coolant cavity and a coolant outlet fluidly coupled to the coolant cavity, the coolant cavity is configured to define a first fluid channel defining a first coolant path from the coolant inlet to the coolant outlet, wherein the coolant cavity defines the first coolant path from the second end of the housing body toward the first end of the housing body, and wherein the first coolant path is thermally coupled to the oil cavity and the motor cavity, such that oil flowing in the oil flow path and coolant flowing in the first coolant path exchange heat through a counter-flow heat exchange, the coolant cavity is configured to define a second fluid channel defining a second coolant path from the coolant inlet to the coolant outlet, wherein the second coolant path is thermally coupled to the electronics cold plate and the motor cavity, and wherein the first fluid channel is substantially parallel to the second fluid channel, and the first coolant path and the second coolant path branch from the coolant inlet and reunite at the coolant outlet.

15. The housing of claim 14, further comprising:

a front end bell attached to the housing body;

a back end bell attached to the housing body; and an oil pump fluidly coupled to the oil cavity, wherein the housing body, the front end bell, and the rear end bell define an outer boundary of the housing, wherein the first flow path and the second flow path are confined within the outer boundary of the housing, and wherein the housing defines an oil flow path from a discharge of the oil pump and returning to a suction of the oil pump, wherein the oil flow path is confined within the outer boundary of the housing.

16. A method comprising:

cooling a motor cavity and an oil cavity using a first coolant path defined by a coolant cavity of a housing for a motor and extending from a coolant inlet to a coolant outlet, wherein a housing body of the housing is a unitary member defining the coolant cavity, the motor cavity, and the oil cavity, and wherein the motor cavity is configured to mechanically support the motor, wherein cooling the motor cavity and the oil cavity includes: flowing oil in the oil cavity from a first end of the housing body toward a second end of the housing body, flowing coolant in the first coolant path from the second end of the housing body toward the first end of the housing body, and exchanging heat between the oil and the coolant through a counter-flow heat exchange; and cooling the motor cavity and an electronics cold plate using a second coolant path defined by the housing body and extending from the coolant inlet to the coolant outlet, wherein the housing body defines the electronics cold plate, and wherein the electronics cold plate is configured to mechanically support electronics to control the motor.

* * * * *